(12) United States Patent
Keshavdas et al.

(10) Patent No.: US 9,392,483 B2
(45) Date of Patent: Jul. 12, 2016

(54) M2M GATEWAY COLLOCATED WITH A BASE STATION USING A CPRI CONNECTION

(71) Applicants: Cellco Partnership, Arlington, VA (US); Verizon Patent and Licensing Inc., Arlington, VA (US)

(72) Inventors: Jyothi Keshavdas, Pleasanton, CA (US); Satish S. Vasamsetti, San Francisco, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 136 days.

(21) Appl. No.: 14/277,283

(22) Filed: May 14, 2014

(65) Prior Publication Data

US 2015/0334591 A1  Nov. 19, 2015

(51) Int. Cl.
*H04W 28/02* (2009.01)
*H04W 4/00* (2009.01)
*H04W 4/18* (2009.01)
*H04W 88/16* (2009.01)
*H04W 92/06* (2009.01)

(52) U.S. Cl.
CPC .......... *H04W 28/0215* (2013.01); *H04W 4/005* (2013.01); *H04W 4/18* (2013.01); *H04W 88/16* (2013.01); *H04W 92/06* (2013.01)

(58) Field of Classification Search
CPC ... H04W 28/0215; H04W 4/005; H04W 4/18; H04W 92/06; H04W 88/16
USPC ........................................... 370/330, 338, 236
See application file for complete search history.

(56) References Cited

U.S. PATENT DOCUMENTS

| | | | |
|---|---|---|---|
| 2013/0094444 A1* | 4/2013 | Lai ........................ | H04W 60/00 370/328 |
| 2013/0195072 A1* | 8/2013 | Zhu ..................... | H04W 72/042 370/330 |
| 2013/0246519 A1* | 9/2013 | Foti ........................ | H04W 4/08 709/204 |
| 2014/0289373 A1* | 9/2014 | Kubota ................... | H04L 45/24 709/219 |
| 2015/0245245 A1* | 8/2015 | Chakrabarti ........ | H04W 28/065 370/338 |

* cited by examiner

*Primary Examiner* — Kwang B Yao
*Assistant Examiner* — Syed M Bokhari

(57) ABSTRACT

A system may include a machine-to-machine (M2M) gateway. The M2M gateway may receive M2M information associated with an M2M application. The M2M gateway may mark the M2M information to create marked information. The marked information may be created to allow the marked information to be identified as M2M information. The M2M gateway may provide the marked information. The marked information may be provided via a wired common public radio interface (CPRI) connection to a base station to permit the base station to identify the marked information as M2M information and provide the marked information to a management device based on identifying the marked information as M2M information.

20 Claims, 6 Drawing Sheets

M2M GATEWAY COLLOCATED WITH A BASE STATION USING A CPRI CONNECTION

BACKGROUND

Common Public Radio Interface (CPRI) is a communications standard that defines the interface of base stations between the Radio Equipment Controllers (REC) and radio units known as Radio Equipment (RE). Use of the CPRI standard may allow for interoperability of equipment associated with different vendors, and may help preserve software investments made by service providers.

DETAILED DESCRIPTION OF PREFERRED EMBODIMENTS

The following detailed description of example implementations refers to the accompanying drawings. The same reference numbers in different drawings may identify the same or similar elements.

A machine-to-machine (M2M) device (e.g., a sensing device, a metering device, etc.), included in an M2M network, may be configured to collect M2M information (e.g., sensor data, meter data, etc.), associated with an M2M application, and provide the M2M information to an M2M gateway associated with the M2M network. The M2M gateway may be configured to provide the M2M information to another device (e.g., an application server), associated with the M2M application, via a core network associated with a service provider. However, the M2M gateway may be configured to provide the M2M information to the core network (e.g., via a base station) using a wireless network, such as a long term evolution (LTE) network. In such a case, the M2M gateway must be capable of communicating via the wireless network (e.g., the M2M gateway must include an LTE chipset in order to communicate with the base station). Additionally, wireless network congestion may result as the volume of M2M information sent via the wireless network increases. As such, it may be desirable to provide the M2M information to the core network in another manner, such as by using a common public radio interface (CPRI) connection. Implementations described herein may allow an M2M gateway to provide M2M information to a base station, associated with a core network, via a CPRI connection. Implementations described herein may also allow the M2M gateway to mark the M2M information such that the M2M information may identified and processed by the core network, accordingly.

Figure 1:
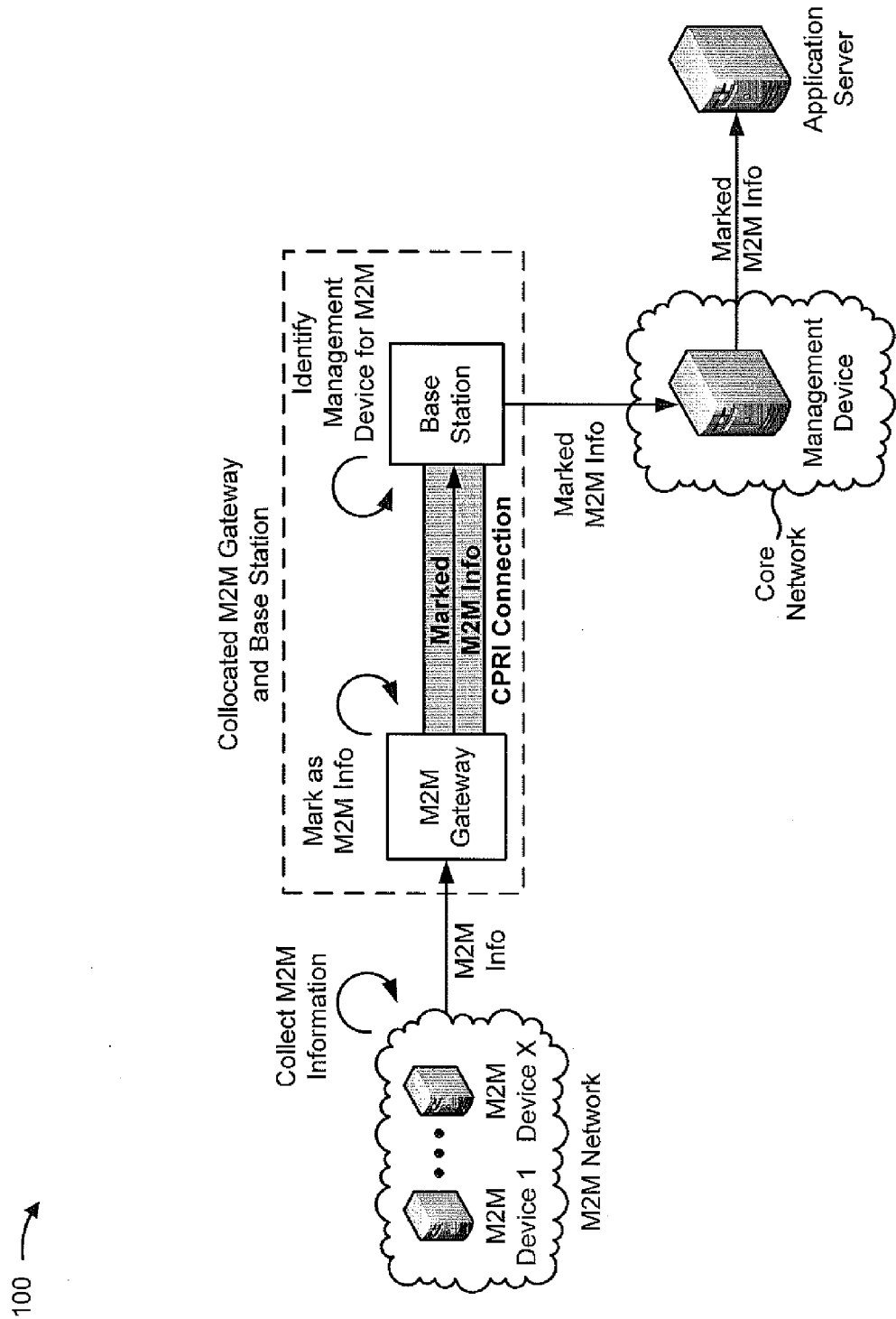
FIG. 1 is a diagram of an overview of an example implementation described herein.

FIG. 1 is a diagram of an overview of an example implementation 100 described herein. For the purposes of example implementation 100, assume that a group of M2M devices (e.g., M2M device 1 through M2M device X), included in an M2M network, are configured to collect M2M information, and provide the M2M information to an M2M gateway to allow the M2M information to be provided to an application server via a core network. Further assume that the M2M gateway is collocated with a base station, associated with the core network, and that the M2M gateway is connected to the base station by a CPRI connection.

As shown in FIG. 1, the group of M2M devices may collect the M2M information, and may provide the M2M information to the M2M gateway (e.g., wirelessly over an unlicensed spectrum). As further shown, the M2M gateway may receive the M2M information, and may mark the M2M information (e.g., by modifying packet headers associated with packets of the M2M information). As further shown, the M2M gateway may provide the marked information to the base station. As shown, the M2M gateway may provide the marked information via a (e.g., wired) CPRI connection between the M2M gateway and the base station. As further shown, the base station may receive the marked information, may identify the marked information as M2M information, and may identify a management device, included in the core network, that is to receive the marked information. In some implementations, the base station may store information that identifies a particular management device that is to receive M2M information, and may identify the management device based on the stored information. As further shown, the base station may then provide the marked information to the management device included in the core network. As shown, the management device may receive the marked information, and may process the M2M traffic, accordingly (e.g., such that the marked information is routed, via the core network, to the application server).

In this way, an M2M gateway may provide M2M information to a base station, associated with a core network, via a CPRI connection (e.g., rather than via a wireless network). The M2M gateway may also mark the M2M information such that the M2M information may identified as M2M information and processed, routed, managed, etc. by the core network, accordingly.

Figure 2:
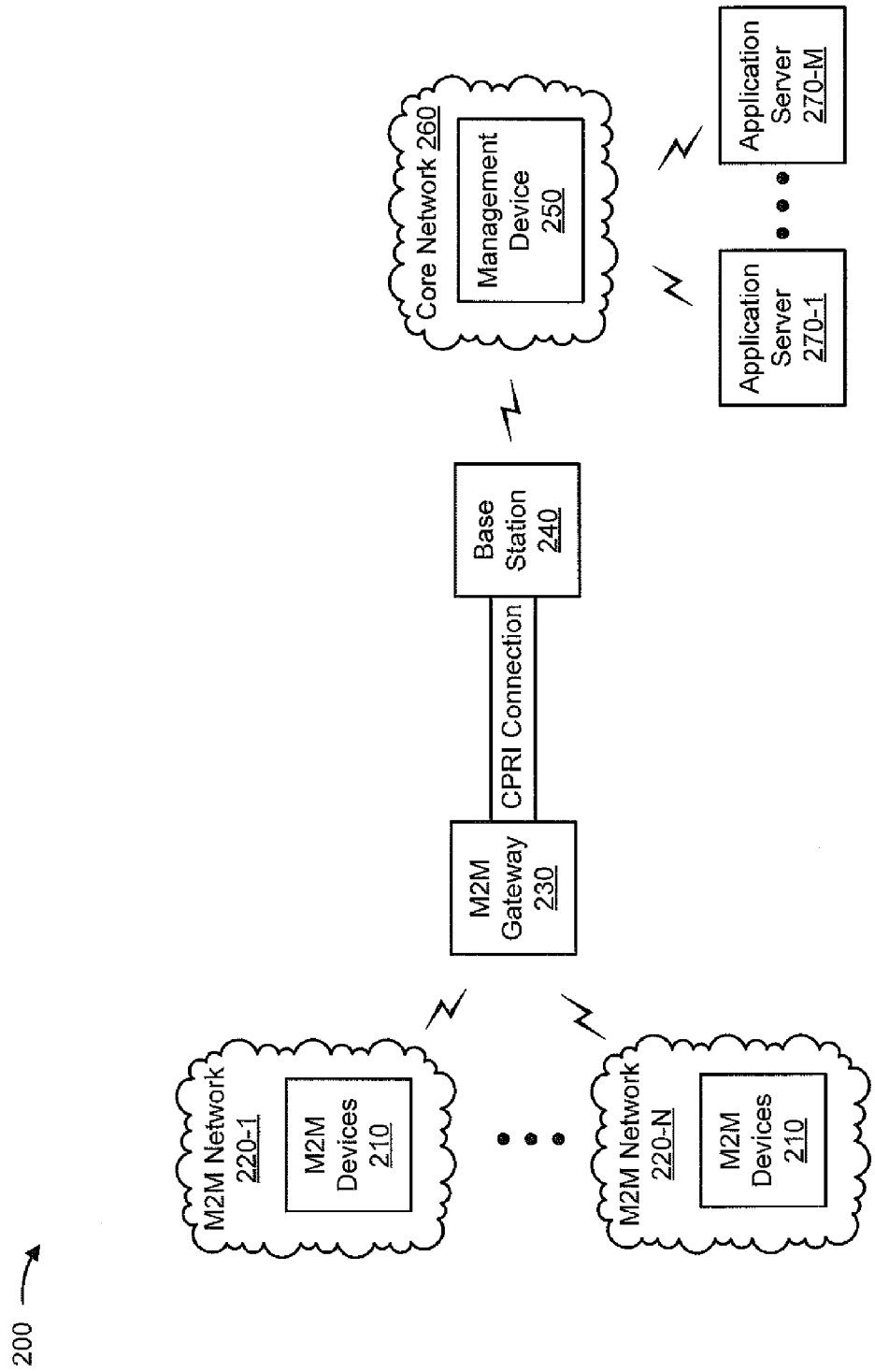
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include M2M devices 210, one or more M2M networks 220-1 through 220-N (N≥1) (hereinafter referred to collectively as "M2M networks 220" and individually as "M2M network 220"), an M2M gateway 230 connected to a base station 240 via a CPRI connection, a management device 250, a core network 260, and one or more application servers 270-1 through 270-M (M≥1) (hereinafter referred to collectively as "application servers 270" and individually as "application server 270"). Unless otherwise specified, devices of environment 200 may interconnect via wired connections, wireless connections, or a combination of wired and wireless connections.

M2M device 210 may include a device associated with receiving, generating, storing, processing, and/or providing M2M information associated with an M2M application. For example, M2M device 210 may include a network device (e.g., a modem, a switch, a gateway, etc.), a sensing device, a processing device, a metering device, and/or some other type of device. For example, M2M device 210 may include a device capable of monitoring and/or sensing M2M information in real-time. In some implementations, M2M device 210 may transmit the M2M information to M2M network 220 and/or M2M gateway 230. In some implementations, one or more M2M devices 210 may be included in M2M network 220. In some implementations, M2M device 210 may be associated with an M2M application hosted by application server 270.

M2M network 220 may include one or more wired and/or wireless networks associated with an M2M application. For example, M2M network 220 may include a cellular network, a public land mobile network ("PLMN"), a local area network ("LAN"), a wireless local area network ("WLAN" or "Wi-Fi network"), a wide area network ("WAN"), a metropolitan area network ("MAN"), an enterprise network, a telephone network, an ad hoc network, an intranet, the Internet, a fiber optic-based network, or a combination of these or other types of networks. In some implementations, M2M network 220 may include one or more M2M devices 210, and the one or more M2M devices 210 may communicate with M2M gateway 230 via M2M network 220. In some implementations, M2M network 220 may allow M2M information to be provided to M2M gateway 230. Additionally, or alternatively, M2M network 220 may allow M2M information to be sent to and/or received from another M2M network 220 (e.g., another M2M network 220 including another M2M device 210).

M2M gateway 230 may include a device capable of providing connectivity for M2M device 210 and/or M2M network 220 to base station 240, core network 260, and/or application server 270. For example, M2M gateway 230 may include one or more data processing and/or traffic transfer devices, such as a gateway, a router (e.g., an edge router, an access router, etc.), a modem, a switch, a firewall, a network interface card ("NIC"), a hub, a bridge, a server, an optical add/drop multiplexer ("OADM"), or any other type of device that processes and/or transfers traffic. In some implementations, M2M gateway 230 may be associated with one or more M2M networks 220. In some implementations, M2M gateway 230 may include a device capable of receiving M2M information from M2M network 220, marking the M2M information as M2M information, and providing the marked information to base station 240. In some implementations, M2M gateway 230 may receive M2M information from multiple M2M networks 220. In some implementations, M2M gateway 230 may be capable of communicating with base station 240 using a CPRI connection. Additionally, or alternatively, one or more M2M gateways 230 may be collocated with (e.g., in the same building, in the same group of buildings, on the same rack, etc.) base station 240. Additionally, or alternatively, one or more M2M gateways 230 may be connected to (e.g., via one or more CPRI connections) base station 240. In some implementations, M2M gateway 230 and base station 240 may be integrated into a single device.

In some implementations, M2M gateway 230 and base station 240 may be associated with a distributed antenna system (DAS). For example, M2M gateway 230 may be collocated with radio equipment (RE) (e.g., a remote radio head), included in the DAS, that may communicate (e.g., via a CPRI connection) with base station 240 (e.g., when base station 240 is configured to act as a radio equipment controller (REC) of the DAS). In this example, M2M gateway 230 may communicate with base station 240 via the CPRI connection associated with the RE. In some implementations, multiple M2M gateways 230 may be associated with a single RE included in the DAS.

Base station 240 may include a device capable of providing marked information, received from M2M gateway 230, to core network 260. In some implementations, one or more base stations 240 may be associated with core network 260 and/or management device 250. In some implementations, base station 240 may be included in core network 260. In some implementations, base station 240 may receive marked information from M2M gateway 230 via a CPRI connection. Additionally, or alternatively, base station 240 may be capable of identifying management device 250 to which the marked information is to be sent. Additionally, or alternatively, base station 240 may be capable of receiving and/or providing non-M2M information (e.g., information other than M2M information) from and/or to core network 260. In some implementations, base station 240 may be an evolved node B (eNB) associated with an LTE network. Additionally, or alternatively, base station 240 may be associated with a small cell, such as a microcell, a picocell, and/or a femtocell.

Management device 250 may include a device capable of selecting a serving gateway and/or a packet data network gateway (e.g., included in core network 260) that is to receive marked information received from base station 240. In some implementations, management device 250 may be associated with one or more M2M gateways 230 and/or one or more base stations 240. Additionally, or alternatively, management device 250 may be capable of receiving marked M2M traffic, identifying the M2M traffic as M2M traffic, and causing the M2M information to be routed via core network 260, accordingly. In some implementations, management device 250 may be a mobility management entity (MME) associated with an LTE network that includes an evolved packet core (EPC).

Core network 260 may include one or more wired and/or wireless networks associated with a service provider. For example, core network 260 may include a cellular network, a PLMN, a LAN, a WLAN, a WAN, a MAN, an enterprise network, a telephone network, an ad hoc network, an intranet, a cloud based network, the Internet, a fiber optic-based network, or a combination of these or other types of networks. In some implementations, core network 260 may include management device 250 and/or one or more other devices (e.g., serving gateways, packet data network gateways, etc.) that enable marked information to be provided to application server 270.

Application server 270 may include a device, such as a server device, that hosts, manages, operates, etc. an M2M application. In some implementations, application server 270 may receive, generate, store, process, and/or provide M2M information provided by M2M devices 210 (e.g., via M2M gateway 230, base station 240, management device 250, and/or core network 260). In some implementations, application server 270 may provide the M2M information to another device associated with the M2M application.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
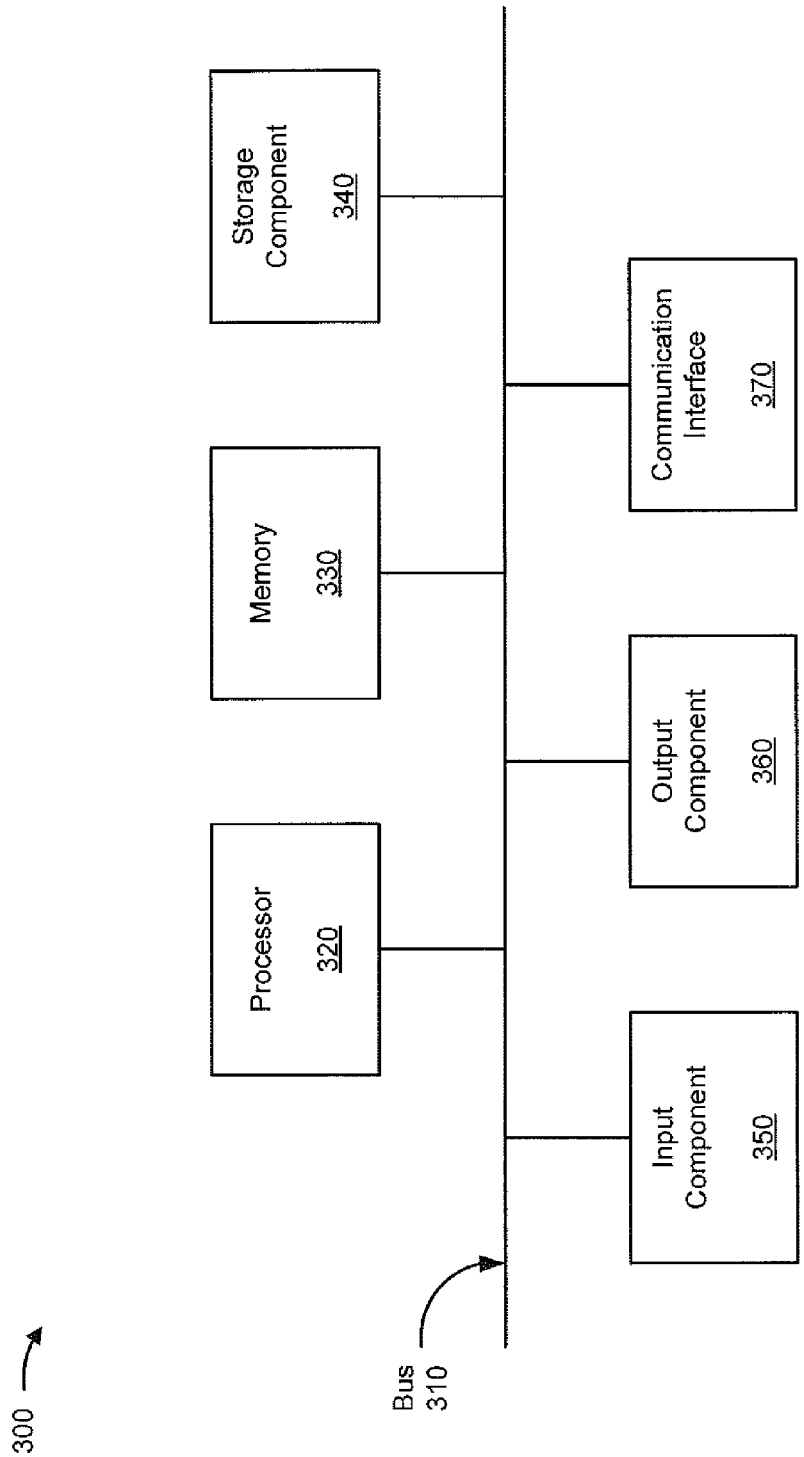
FIG. 3 is a diagram of example components of one or more devices of FIG. 2.

FIG. 3 is a diagram of example components of a device 300. Device 300 may correspond to M2M device 210, M2M gateway 230, base station 240, management device 250, and/or application server 270. In some implementations, M2M device 210, M2M gateway 230, base station 240, management device 250, and/or application server 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
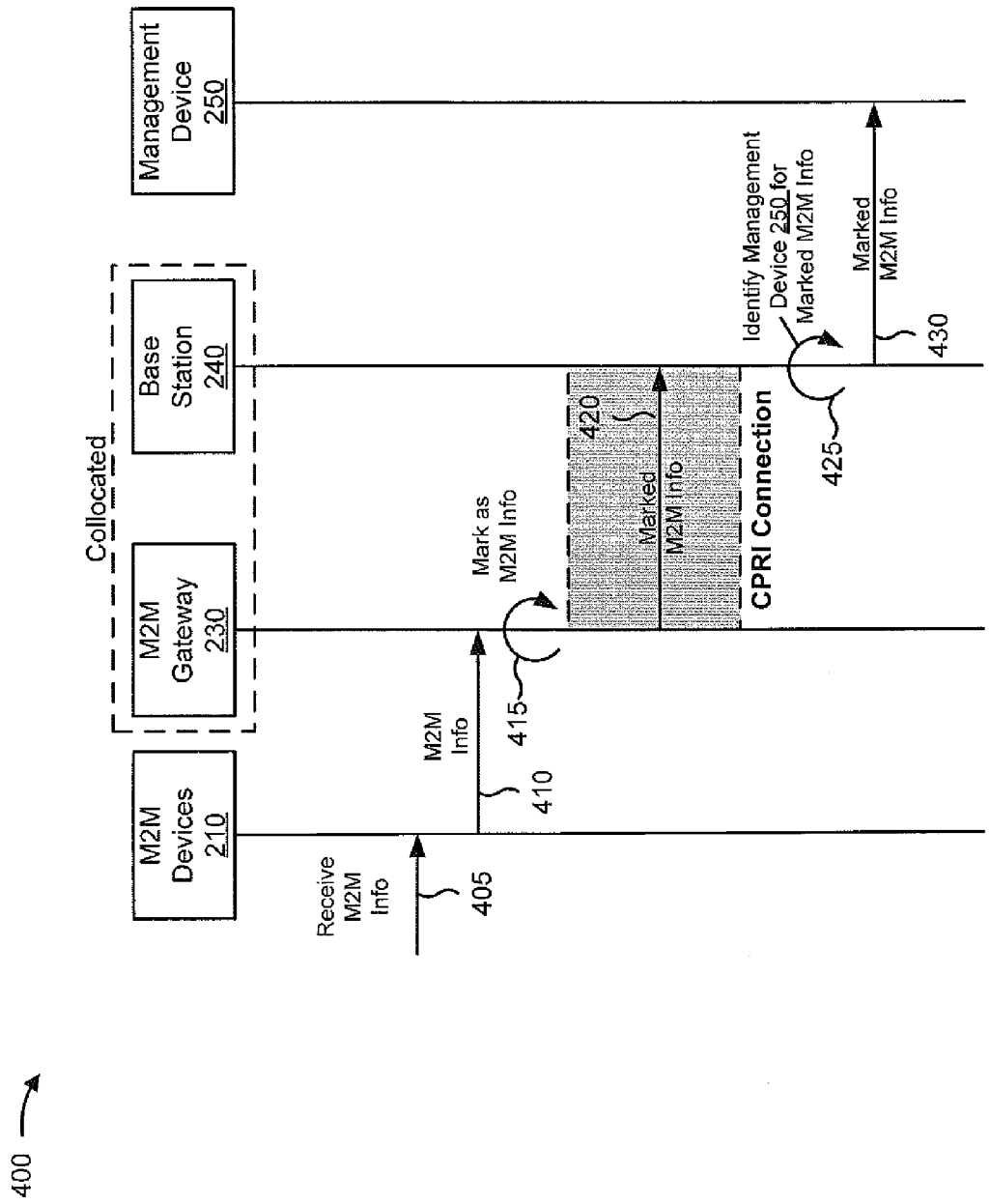
FIG. 4 is a call flow diagram of an example process for marking machine-to-machine information and providing the marked machine-to-machine information via a common public radio interface connection.

FIG. 4 is a call flow diagram of an example process 400 for marking machine-to-machine information and providing the marked machine-to-machine information via a common public radio interface connection. In some implementations, one or more operations of FIG. 4 may be performed by one or more devices included in environment 200.

As shown in FIG. 4, process 400 may include receiving M2M information associated with an M2M application (shown at reference number 405). For example, M2M device 210 may receive M2M information associated with an M2M application. In some implementations, M2M device 210 may receive the M2M information when M2M device 210 generates, determines, detects, senses, monitors, measures, gathers, collects, and/or otherwise obtains the M2M information.

M2M information may include information (e.g., sensor data, metering data, image data, video data, etc.) associated with an M2M application. For example, the M2M information may include sensor data, detected by M2M device 210, associated with an M2M application. In some implementations, the M2M information may be received by M2M device 210 to permit the M2M information to be used by application server 270, associated with the M2M application, to manage, operate, and/or provide the M2M application. In some implementations, one or more M2M devices 210, included in one or more M2M networks 220, may receive M2M information associated with a particular M2M application.

As further shown in FIG. 4, process 400 may include providing the M2M information (shown at reference number 410). For example, M2M device 210 may provide the M2M information to M2M gateway 230. In some implementations, M2M device 210 may provide the M2M information after M2M device 210 receives the M2M information. Additionally, or alternatively, M2M device 210 may provide the M2M information when M2M device 210 receives information, indicating that M2M device 210 is to provide the M2M information, from another device, such as M2M gateway 230.

In some implementations, M2M device 210 may provide the M2M information to M2M gateway 230 via M2M network 220 associated with M2M device 210. Additionally, or alternatively, M2M device 210 may provide the M2M information to M2M gateway 230 over an unlicensed spectrum using a communications protocol such as Wi-Fi, Zigbee, Bluetooth, Zwave, or the like. In some implementations, M2M device 210 may provide the M2M information in real-time (e.g., as M2M device 210 receives the M2M information). Additionally, or alternatively, M2M device 210 may periodically (e.g., every 30 seconds, every 5 minutes, once a day, etc.) provide the M2M information to M2M gateway 230. Additionally, or alternatively, M2M device 210 may provide the M2M information based on a request from M2M gateway 230 (e.g., when M2M gateway 230 provides an indication that M2M device 210 is to provide the M2M information).

As further shown in FIG. 4, process 400 may include marking the M2M information to create marked information (shown at reference number 415). For example, M2M gateway 230 may mark the M2M information to create marked information. In some implementations, M2M gateway 230 may mark the M2M information after M2M gateway 230 receives the M2M information provided by M2M device 210. Additionally, or alternatively, M2M device 230 may mark the M2M information when M2M device 230 receives information, indicating that M2M gateway 230 is to mark the M2M information, from another device.

When marking the M2M information, M2M gateway 230 may modify a portion of the M2M information to indicate that the M2M information is M2M information. For example, M2M gateway 230 may store information that identifies M2M identification information, such as an M2M packet header, that is to be used to mark the M2M information. In this example, M2M gateway 230 may receive the M2M information from M2M device 210 and may modify packet headers, included in the M2M information, such that each packet header matches the M2M packet header. In some implementations, the M2M identification information may be associated with all M2M applications (e.g., the M2M identification information may not be M2M application specific). Additionally, or alternatively, the M2M identification information may be associated with a particular M2M application, a particular M2M network 220, and/or a particular M2M device 210. In some implementations, M2M gateway 230 may mark the M2M information in another manner.

In this way, another device (e.g., base station 240, management device 250, another device included in core network 260, etc.) may receive the marked information and may identify the marked information as M2M information (e.g., when the M2M identification information is known to the other device). In some implementations, M2M gateway 230 may mark the M2M information to cause the marked information to be processed in a particular manner. For example, one or more devices included in core network 260 may be configured to route, process, provide, manage, etc. M2M information in a different manner than non-M2M information. In this example, the one or more devices may identify the marked information as M2M information, and may route, process, provide, manage, etc. the marked information, accordingly.

As further shown in FIG. 4, process 400 may include providing the marked information via a common public radio interface connection (shown at reference number 420). For example, M2M gateway 230 may provide, to base station 240, the marked information via a CPRI connection. In some implementations, M2M gateway 230 may provide the marked information after M2M gateway 230 creates the marked information. Additionally, or alternatively, M2M gateway 230 may provide the marked information when M2M gateway 230 receives information, indicating that M2M gateway 230 is to provide the marked information, from another device, such as base station 240.

In some implementations, M2M gateway 230 may provide the marked information based on information associated with M2M gateway 230. For example, M2M gateway 230 may receive the M2M information, and may determine whether M2M gateway 230 has sufficient computing resources (e.g., processing power) available to provide the marked information to base station 240. In this example, M2M gateway 230 may provide the marked information to base station 240 when M2M gateway 230 determines that M2M gateway 230 has sufficient processing power available to provide the marked information. Additionally, or alternatively, M2M gateway 230 may provide the marked information in real-time (e.g., as M2M gateway 230 marks the M2M information). Additionally, or alternatively, M2M gateway 230 may periodically (e.g., every 30 seconds, every 5 minutes, once a day, etc.) provide the marked information to base station 240. Additionally, or alternatively, M2M gateway 230 may provide the marked information based on information received from base station 240 (e.g., when base station 240 provides an indication that M2M gateway 230 is to provide the marked information).

In some implementations, M2M gateway 230 may provide the marked information to base station 240 via a CPRI connection. For example, M2M gateway 230 may be connected (e.g., via a wired connection) to base station 240 that supports communication using the CPRI standard, and M2M gateway 230 may provide the marked information via the CPRI connection. In some implementations, M2M gateway 230 may be collocated with base station 240. Additionally, or alternatively, one or more M2M gateways 230 may be connected to a single base station 240 via one or more CPRI connections. In this way, M2M gateway 230 may provide the marked information to base station 240 in a secure manner without using a wireless network (e.g., an LTE network).

As further shown in FIG. 4, process 400 may include identifying a management device to which the marked information is to be provided (shown at reference number 425). For example, base station 240 may identify management device 250 to which the marked information is to be provided. In some implementations, base station 240 may identify management device 250 after base station 240 receives the marked information provided by M2M gateway 230 via the CPRI connection.

When identifying management device 250, base station 240 may identify management device 250 that is configured to receive, route, process, provide, manage, etc. the marked information. In some implementations, base station 240 may identify management device 250 based on information stored by base station 240. For example, base station 240 may store information (e.g., a network address) that identifies a particular management device 250 that is configured to receive marked information. In this example, base station 240 may receive the marked information, may identify the M2M information as M2M information, and may identify (e.g., based on the stored information), the particular management device 250 that is to receive the marked information. In some implementations, management device 250 may be configured to receive any marked information (e.g., marked information associated with any M2M application). Additionally, or alternatively, management device 250 may be configured to receive M2M information associated with a particular M2M application, a particular M2M network 220, and/or a particular M2M device 210.

In some implementations, base station 240 may identify management device 250 based on identifying the marked information as M2M information. For example, base station 240 may store M2M identification information used to create the marked information, as described above. In this example, base station 240 may receive the marked information, and may determine (e.g., based on the stored M2M identification information) that the marked information includes the M2M identification information. As such, base station 240 may identify that the marked information as M2M information. Base station 240 may then identify management device 250 after identifying the marked information as M2M information.

As further shown in FIG. 4, process 400 may include providing the marked information to the management device (shown at reference number 430). For example, base station 240 may provide the marked information to management device 250. In some implementations, base station 240 may provide the marked information after base station 240 identifies management device 250 that is to receive the marked information. Additionally, or alternatively, base station 240 may provide the marked information when base station 240 receives information, indicating that base station 240 is to provide the marked information, from another device, such as management device 250.

In some implementations, base station 240 may provide the marked information to management device 250 identified by base station 240. Management device 250 may receive the marked information, and may process the M2M traffic, accordingly (e.g., such that the marked information is provided, via core network 260, to application server 270 associated with the M2M information).

Although FIG. 4 shows example operations of process 400, in some implementations, process 400 may include additional operations, different operations, fewer operations, or differently arranged operations than those depicted in FIG. 4. Additionally, or alternatively, one or more of the operations of process 400 may be performed in parallel.

Figure 5:
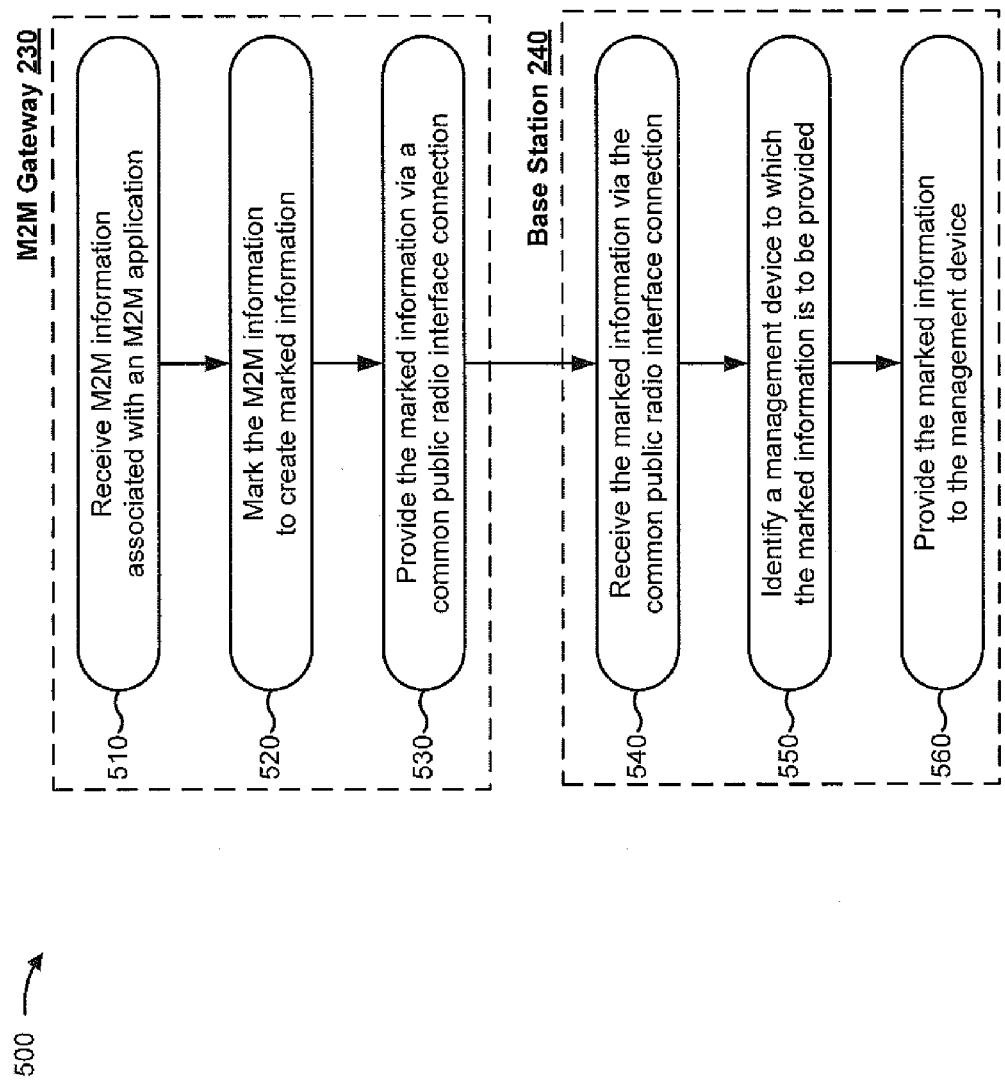
FIG. 5 is a flow chart of an example process for marking machine-to-machine information and providing the marked machine-to-machine information via a common public radio interface connection.

FIG. 5 is a flow chart of an example process 500 for marking machine-to-machine information and providing the marked machine-to-machine information via a common public radio interface connection. In some implementations, one or more process blocks of FIG. 5 may be performed by M2M gateway 230 or base station 240. In some implementations, one or more process blocks of FIG. 5 may be performed by another device or a group of devices separate from or including M2M gateway 230 or base station 240, such as another device included in environment 200.

As shown in FIG. 5, process 500 may include receiving M2M information associated with an M2M application (block 510). For example, M2M gateway 230 may receive M2M information associated with an M2M application. In some implementations, M2M gateway 230 may receive M2M information from one or more M2M devices 210 via one or more M2M networks 220, as described above.

As further shown in FIG. 5, process 500 may include marking the M2M information to create marked information (block 520). For example, M2M gateway 230 may mark the M2M information, received from M2M devices 210, to create marked information, as discussed above.

As further shown in FIG. 5, process 500 may include providing the marked information via a common public radio interface connection (block 530). For example, M2M gateway 230 may provide, to base station 240, the marked information, using a wired common public radio interface connection, as discussed above.

As further shown in FIG. 5, process 500 may include receiving the marked information via the common public radio interface (block 540). For example, base station 240 may receive, from M2M gateway 230, the marked information via the common public radio interface, as discussed above.

As further shown in FIG. 5, process 500 may include identifying a management device to which the marked information is to be provided (block 550). For example, base station 240 may identify management device 250 to which the marked information is to be provided, as discussed above.

As further shown in FIG. 5, process 500 may include providing the marked information to the management device (block 560). For example, base station 240 may provide the marked information to management device 250, as discussed above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
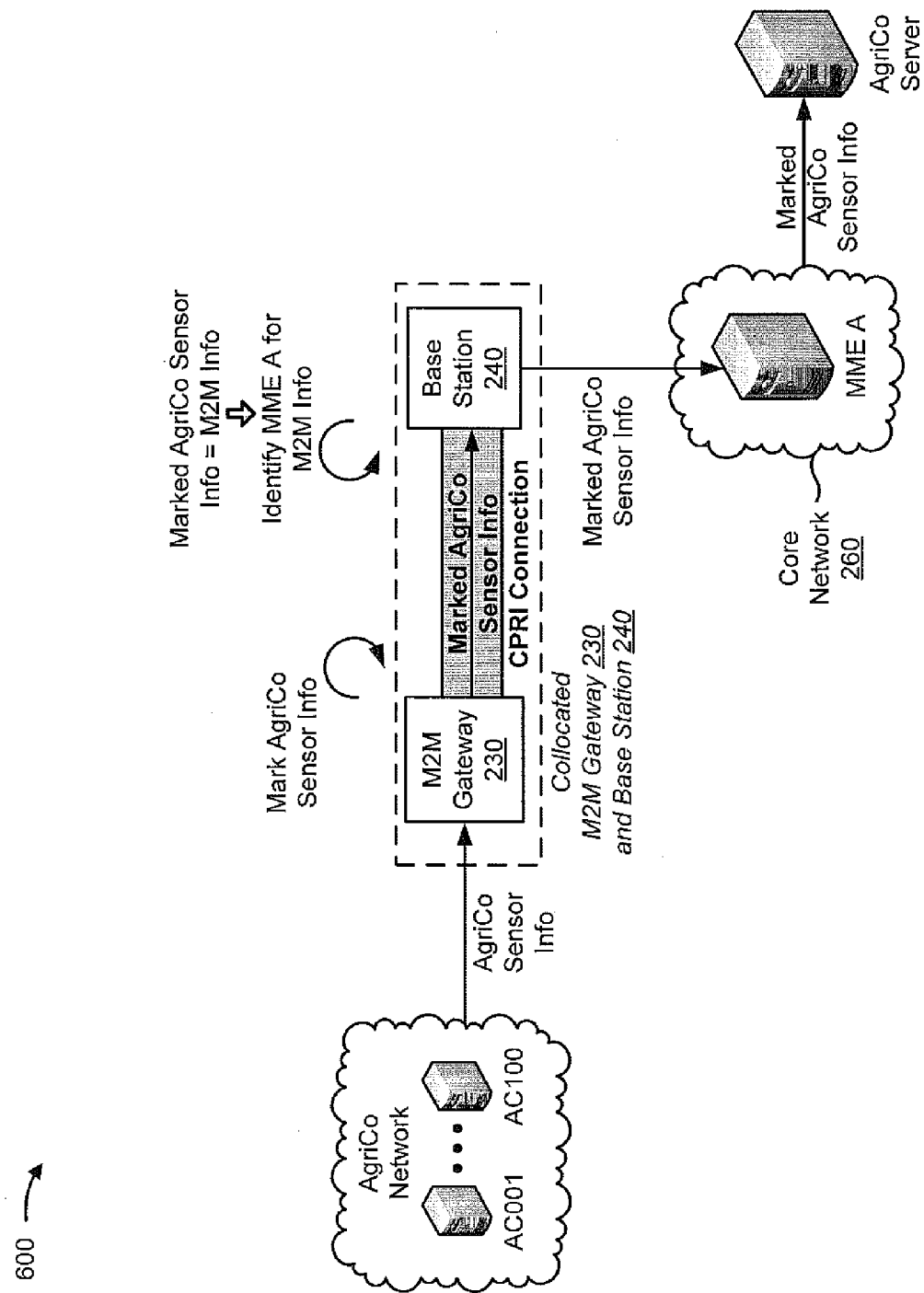
FIG. 6 is a diagram of an example implementation relating to the example processes shown in FIG. 4 and FIG. 5.

FIG. 6 is a diagram of an example implementation 600 relating to example processes 400 and 500 shown in FIG. 4 and FIG. 5, respectively. For the purposes of example implementation 600, assume that a group of M2M devices (e.g., AC001 through AC100) are included in an M2M network (e.g., AgriCo network) and that each M2M device includes one or more sensors that are configured to collect M2M information (e.g., AgriCo sensor information), associated with an AgriCo application hosted by an AgriCo server. Further, assume that the group of M2M devices is configured to provide the AgriCo sensor information, via the AgriCo network, to M2M gateway 230. Finally, assume that M2M gateway 230 is collocated with base station 240, and that M2M gateway 230 is configured to communicated with base station 240 via a wired CPRI connection.

As shown in FIG. 6, the group of M2M devices may receive (e.g., by sensing) the AgriCo sensor information and may provide (e.g., via a Wi-Fi network) the AgriCo sensor information to M2M gateway 230. As shown, M2M gateway 230 may receive the AgriCo sensor information provided by the group of M2M devices. As shown, M2M gateway 230 may mark the AgriCo sensor information as M2M information. For example, M2M gateway 230 may mark the AgriCo sensor information by modifying packet headers, corresponding to packets that include the AgriCo sensor information, such that the packet headers identify the AgriCo sensor information as M2M information. For the purposes of example implementation 600, assume that base station 240 stores information associated with the packet header used by M2M gateway 230 to mark the packets that include the AgriCo sensor information (e.g., such that base station 240 may identify the marked AgriCo sensor information as M2M information).

As further shown in FIG. 6, M2M gateway 230 may provide the marked AgriCo sensor information to base station 240 via the wired CPRI connection. As further shown, base station 240 may receive the marked AgriCo sensor information, and may identify (e.g., based on the packet headers included in the marked AgriCo sensor information) the marked AgriCo sensor information as M2M information. As further shown, base station 240 may then identify management device 250 (e.g., MME A), included core network 260, that is to receive the marked AgriCo sensor information. For example, base station 240 may store information indicating that all M2M information, for AgriCo, received by base station 240 is to be provided to MME A, and base station 240 may determine that the marked AgriCo sensor information is to be provided to MME A based on the stored information.

As further shown, base station 240 may provide the marked AgriCo sensor information to MME A. As shown, the marked AgriCo traffic may be then be routed (e.g., based on configurations of devices included in core network 260) to the AgriCo server associated with the AgriCo M2M application.

As indicated above, FIG. 6 is provided merely as an example. Other examples are possible and may differ from what was described with regard to FIG. 6.

Implementations described herein may allow an M2M gateway to provide M2M information to a base station, associated with a core network, via a wired CPRI connection. Implementations described herein may also allow the M2M gateway to mark the M2M information such that the M2M information may be identified and processed by the core network, accordingly.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    a machine-to-machine (M2M) gateway to:
        receive first M2M information;
        mark the first M2M information to create first marked information,
            the first marked information being created to allow the first marked information to be identified as the first M2M information;
        provide the first marked information,
            the first marked information being provided via a wired common public radio interface (CPRI) connection to a base station to permit the base station to identify the first marked information as the first M2M information and provide the first marked information to a first management device based on identifying the first marked information as the first M2M information;
        receive second M2M information;
        mark the second M2M information to create second marked information,
            the second marked information being created to allow the second marked information to be identified as the second M2M information; and
        provide the second marked information,
            the second marked information being provided via the wired CPRI connection to the base station to permit the base station to identify the second marked information as the second M2M information and provide the second marked information to a second management device.

2. The system of claim 1, where the M2M gateway is collocated with the base station.

3. The system of claim 1, where the M2M gateway, when marking the first M2M information to create the first marked information, is to:
    determine M2M identification information associated with marking the first M2M information; and
    modify a portion of the first M2M information to include the M2M identification information.

4. The system of claim 1, where the M2M gateway, when marking the first M2M information to create the first marked information, is to:
    modify a packet header, associated with the first M2M information, to create a modified packet header,
        the packet header being modified such that the first marked information may be identified as first M2M information based on the modified packet header.

5. The system of claim 1, where the first M2M information is associated with a first M2M application and the second M2M information is associated with a second M2M application,
    the second M2M application being different from the first M2M application, and
    the second M2M information being different from the first M2M information;
    where the second marked information is different from the first marked information; and
    where the second management device is different from the first management device.

6. The system of claim 1, where the M2M gateway is further to:
    determine that the M2M gateway has sufficient computing resources available to provide the first marked information; and
    where the M2M gateway, when providing the first marked information, is further to:
        provide the first marked information based on determining that the M2M gateway has sufficient computing resources available to provide the first marked information.

7. The system of claim 1, where the M2M gateway is further to:
    receive an indication the M2M gateway is to provide the first marked information; and
    where the M2M gateway, when providing the first marked information, is further to:
        provide the first marked information based on receiving the indication that the M2M gateway is to provide the first marked information.

8. A system, comprising:
    a first device to:
        receive first machine-to-machine (M2M) information;
        mark the first M2M information to create first marked information,
            the first marked information being created to cause the first marked information to be identified as first M2M information;
        send the first marked information to a second device,
            the first marked information being sent via a common public radio interface (CPRI) connection;
        receive second M2M information;
        mark the second M2M information to create second marked information, the second marked information being created to cause the second marked information to be identified as second M2M information; and
send the second marked information to the second device,
the second marked information being sent via the CPRI connection; and
the second device to:
receive the first marked information via the CPRI connection;
determine that the first marked information is first M2M information based on receiving the first marked information;
identify a particular device to which the first marked information is to be provided,
the particular device being identified based on identifying the first marked information as first M2M information;
receive the second marked information via the CPRI connection;
determine that the second marked information is second M2M information based on receiving the second marked information;
send the first marked information to the particular device; and
send the second marked information to a second particular device.

9. The system of claim 8, where the first device, when marking the first M2M information to create the first marked information, is further to:
determine M2M identification information associated with marking the first M2M information; and
modify a portion of the first M2M information to include the M2M identification information.

10. The system of claim 9, where the second device is further to:
determine that the first marked information includes the M2M identification information; and
where the second device, when determining that the first marked information is first M2M information, is to:
determine that the first marked information is first M2M information based on determining that the first marked information includes the M2M identification information.

11. The system of claim 8, where the CPRI connection includes:
a wired connection between the first device and the second device,
the first device being collocated with the second device.

12. The system of claim 8, where the second device is further to:
store information indicating that a certain device is to receive the first marked information; and
where the second device, when identifying the particular device to which the first marked information is to be provided, is to:
identify the particular device as the certain device based on the stored information.

13. The system of claim 8, where the first M2M information is associated with a first M2M application and the second M2M information is associated with a second M2M application,
the second M2M information being different from the first M2M information, and
the second M2M application being different from the first M2M application;
where the second marked information is different from the first marked information;
where the particular device is a first particular device; and
where, when sending the second marked information to the second particular device, the second device is to:
identify a second particular device to which the second marked information is to be provided,
the second particular device being different from the first particular device.

14. The system of claim 8, where the first device, when marking the first M2M information to create the first marked information, is to:
modify a packet header, associated with the first M2M information, to create a modified packet header,
the packet header being modified such that the first marked information may be identified as first M2M information based on the modified packet header.

15. A method, comprising:
receiving, by a first device, first M2M information;
marking, by the first device, the first M2M information to create first marked information,
the first marked information being created to allow the first marked information to be identified as the first M2M information;
providing, by the first device, the first marked information,
the first marked information being provided via a common public radio interface (CPRI) connection to a second device to permit the second device to identify the first marked information as the first M2M information and provide the first marked information to a first management device based on identifying the first marked information as the first M2M information;
receiving, by the first device, second M2M information;
marking, by the first device, the second M2M information to create second marked information,
the second marked information being created to allow the second marked information to be identified as the second M2M information; and
providing, by the first device, the second marked information,
the second marked information being provided via the CPRI connection to the second device to permit the second device to identify the second marked information as the second M2M information and provide the second marked information to a second management device.

16. The method of claim 15, where marking the first M2M information to create the first marked information comprises:
determining M2M identification information associated with marking the first M2M information; and
modifying a portion of the first M2M information to include the M2M identification information.

17. The method of claim 15, further comprising:
determining that the first device has sufficient computing resources available to provide the first marked information; and
where providing the first marked information comprises:
providing the first marked information based on determining that the first device has sufficient computing resources available to provide the first marked information.

18. The method of claim 15, where the first device is collocated with the second device.

19. The method of claim 15, where the first M2M information is associated with a first M2M application and the second M2M information is associated with a second M2M application, the second M2M information being different from the first M2M information, the second M2M application being different from the first M2M application, where the second marked information is different from the first marked information, and where the second management device is different from the first management device.

20. The method of claim 15, where marking the first M2M information to create the first marked information comprises:

modifying packet headers, associated with the first M2M information, to create modified packet headers, the packet headers being modified to permit the first marked information to be identified as first M2M information based on the modified packet headers.

* * * * *